United States Patent [19]
Byrnes, Sr.

[11] 3,883,898
[45] May 20, 1975

[54] PROTECTIVE GLOVE FOR USE IN MEAT PROCESSING PLANTS

[76] Inventor: Robert M. Byrnes, Sr., P.O. Box 11218, Ames Avenue Station, Omaha, Nebr. 68111

[22] Filed: May 13, 1974

[21] Appl. No.: 469,863

[52] U.S. Cl. ................................................ 2/167
[51] Int. Cl. .......................................... A41d 19/00
[58] Field of Search .......... 2/167, 159, 158, 161 A, 2/161 R, 168, 46, 48

[56] References Cited
UNITED STATES PATENTS
1,736,928  11/1929  Lowe ...................................... 2/167
2,629,102  2/1953  Howells .................................. 2/51
2,824,011  2/1958  Williams ............................... 99/174

Primary Examiner—Geo. V. Larkin
Attorney, Agent, or Firm—Clarence A. O'Brien; Harvey B. Jacobson

[57] ABSTRACT

An article of manufacture in the form of protective garments such as safety gloves, aprons, leggings and other outer garments for use by persons engaged in various operations in meat packing plants and a shroud or clothing for a beef or similar animal carcass constructed from a woven or non-woven aramid fiber having unique properties advantageously employed in such articles of manufacture which fiber is manufactured by the DuPont Company of Wilmington, Delaware under the trademark "Kelvar."

1 Claim, 4 Drawing Figures

PATENTED MAY 20 1975  3,883,898

PROTECTIVE GLOVE FOR USE IN MEAT PROCESSING PLANTS

BACKGROUND OF THE INVENTION

1. Field of the Invention

The present invention generally relates to protective garments and animal carcass shrouds employed in meat processing or packing plants for protecting employees engaged in various operations in such a plant and more effectively clothing an animal carcass thereby enabling the meat packing plant personnel to more safely and effectively perform their duties and to provide a better animal carcass by improving the characteristics of the carcass shroud.

2. Description of the Prior Art

In the processing of animal carcasses in a meat packing plant, after slaughtering, eviscerating and in some instances skinning, the carcass is covered with a shroud and placed in a cooler for chilling. Such shrouds are normally constructed of cotton or other natural fibers such as ramie. U.S. Pat. No. 2,824,011, issued Feb. 18, 1958, describes this procedure in detail and sets forth the advantages derived from the use of a shroud. Also, in meat packing plants, a substantial portion of the personnel is engaged in meat cutting operations in which sharp knives must be used which results in many accidents where the user of such a knife will accidentally cut himself. As a result of the occurrence of such accidents, safety garments have been developed and are being currently used in meat packing plants. Such safety garments are in the form of gloves, arm guards, aprons, with or without the bibs, leggings and the like. Presently available protectors and safety garments of this type are constructed of a metal mesh material which is constructed of small brass rings connected together to form a mesh-like metal fabric. Safety garments of the type used in the meat packing industry are at least partially disclosed in U.S. Pat. Nos. 1,736,928, issued Nov. 21, 1929 and 2,629,102 issued Feb. 24, 1953.

The metal mesh fabric of the brass ring type presents problems when the metal links break since the links will fall into the product that the person is working on thus contaminating the meat, fish or poultry product. Also, due to the manner in which the mesh material is constructed, it collects fat, meat, dirt and provides areas for bacteria growth which introduces further possibility of contamination. Also, the metal mesh material tends to irritate the skin of the wearer when it is formed into a glove, arm guard or the like due to its abrasiveness and also due to its weight which introduces a fatigue factor. Frequently, persons wearing metal mesh gloves, aprons, arm guards, leg guards and the like work in a cooler to protect the meat products they are cutting from being exposed to warm air which will provide a longer shelf life for the products. Due to this cool condition, cotton gloves are frequently worn under the mesh gloves to keep the hands warm due to the open mesh and conductivity of the metal. When such gloves and the mesh material are used, the mesh material quickly becomes colored very similar to the meat product thus making it difficult for the person using the knife to distinguish between the meat product and the glove which is believed to be a frequent cause of the meat cutter cutting into the glove and in some instances cutting himself.

SUMMARY OF THE INVENTION

An object of the invention is to provide protective garments and animal carcass shrouds for meat processing plants constructed of a material which provides significant advantages in use.

Another object of the invention is to provide a novel and unique method of protecting meat processing plant employees and covering an animal carcass by providing a covering of a woven or non-woven aramid fiber manufactured by the DuPont Company and sold under the trademark "Kevlar."

A further object of the invention is to provide an animal carcass shroud which is resistant to heat, does not shrink, will not unravel and will not be torn by the use of conventional shroud pins and capable of longer life when complying with regulations that the shroud must be washed in various caustics, soaps, bleaches and the like after each use with the shroud material being resistant to moisture penetration thereby reducing carcass shrinkage and eliminating the necessity to presoak in salt water or saline solutions with the shroud only being dipped in hot water prior to application to the carcass with the shroud maintaining the moisture content of the carcass for reduction in the loss of moisture and weight and providing a meat product or carcass having a more attractive appearance or "bloom" when delivered to the customer.

Still another object of the invention is to provide a protective garment such as gloves, arm guards, leggings, aprons and the like constructed of the aforementioned unique material which is light in weight, flexible in nature and as resistant to penetration by cutting implements as metal mesh garments of this type.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
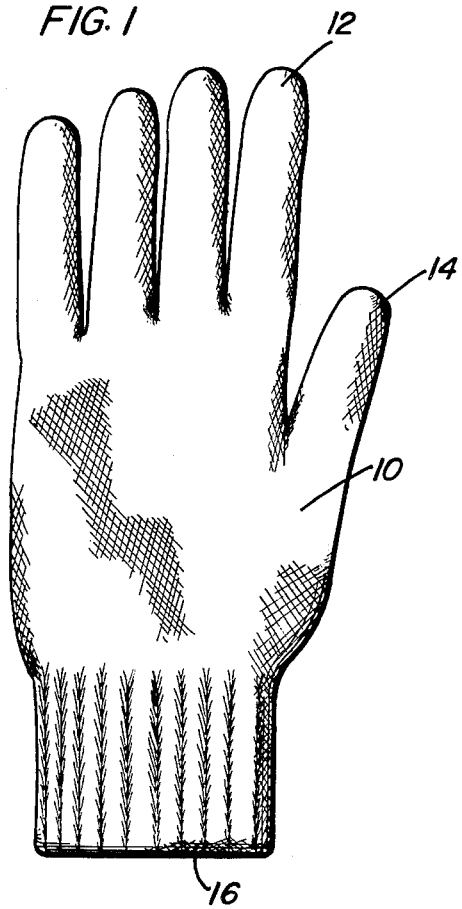
FIG. 1 is a plan view of a safety glove constructed in accordance with the present invention.
Figure 2:
FIG. 2 is a fragmental sectional view, on an enlarged scale, illustrating the construction of the glove.

FIG. 1 illustrates a glove 10 having the usual fingerstalls 12, thumbstall 14 and wrist cuff 16 with the glove being constructed of various standard sizes and, as illustrated in FIG. 2, the material from which the glove 10 is formed includes yarn strands 18 which are either woven, non-woven or knitted with the glove being manufactured by conventional manufacturing techniques such as is employed in constructing gloves of natural fibers.

Figure 3:
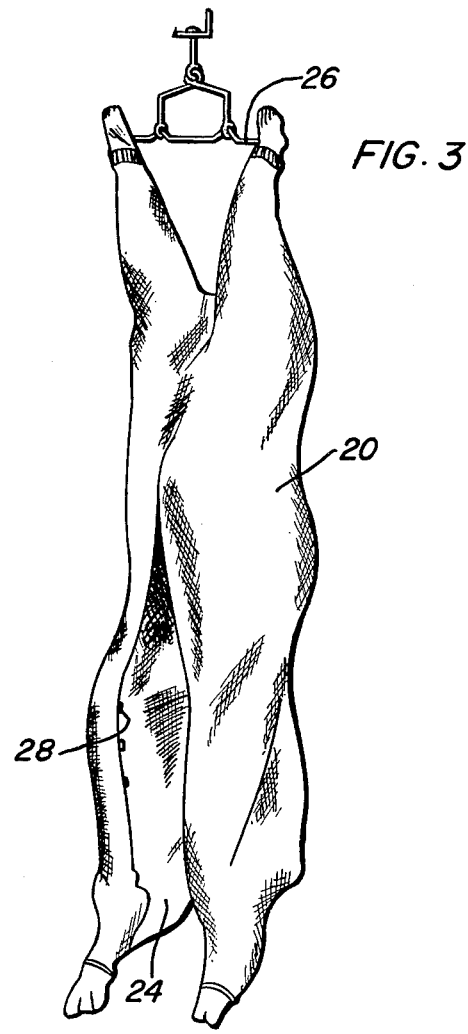
FIG. 3 is a perspective view of a beef carcass and shroud thereon.

FIG. 3 illustrates a shroud 20 covering a beef carcass 24 suspended from conventional hooks 26 and the like with the shroud 20 wrapped snugly and smoothly about the surface of the carcass 24 and tied or otherwise secured to the legs of the carcass and secured to the visceral cavity by shroud pins 28 of conventional construction.

Figure 4:
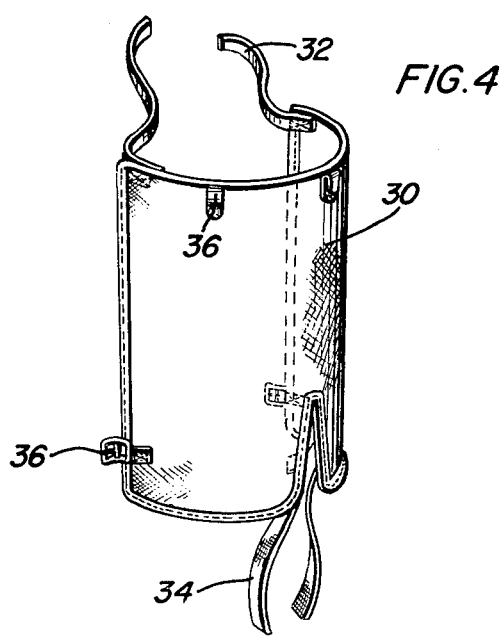
FIG. 4 is a perspective view of an apron constructed in accordance with the present invention.

FIG. 4 illustrates an apron 30 having waist tie strings or straps 32 and leg straps 34 each of which may be associated with buckles 36 or other anchoring devices to enable the apron to be worn by a person working in a meat packing plant. In addition to the gloves and apron illustrated, the apron may be constructed with a bib or provided with downwardly extending leg covering members or leggings and also, arm guards may be provided of conventional shape and configuration.

The material from which the articles of manufacture disclosed in this application are constructed is unique for this purpose and is commercially available from the DuPont Company under the trademark "Kevlar." This material is an aramid fiber and the articles of manufacture disclosed and the methods of using such articles of manufacture utilize the properties of such material in a unique manner for accomplishing beneficial results when used.

The aforementioned material is substantially stronger than steel on an equal weight basis and has unusually high resistance to penetration as well as resistance to stretch and high temperatures. This material is a fiber-like material and will not break and drop into the meat product thus eliminating one source of contamination. This material is resistant to absorption of water, blood or moisture of any sort and thus will not harbor bacteria as metal mesh does thereby eliminating another source of contamination of the meat product. This material since it is a fiber or fabric-like material does not irritate the skin when it is worn because the material is not abrasive. Further, this material is substantially lighter than metal mesh material thereby reducing fatigue of the user. Further, this material is a good insulator thus eliminating the necessity of using an underlying cotton glove when working in areas of low temperature. This material is yellowish gold in color and will not absorb blood, fat and the like and is readily distinguishable from meat products due to its color so that the meat plant worker can readily distinguish between the meat product and his hand and fingers at all times. In addition, gloves and other safety garments will be much more flexible and not hang up on various power machinery and can be readily and much more easily washed and cleaned with water temperature of 180°F. By using gloves of this material and eliminating the bulky, heavy metal mesh gloves, a packing plant operator or employee can produce more work with less fatigue and with more accuracy.

When used in a shroud, this material would not absorb odors as cotton does and would not tear and shred because of using shroud pins to hold them on the carcass which seriously damages the cotton and ramie shrouds. Thus, the shrouds would last considerably longer and would not allow moisture to escape from the carcass in a cooler thus keeping the moisture and weight in the carcass and at the same time providing a better texture and appearance to the carcass. Shrouds for animal carcasses must be washed after each use and this material will withstand many more washings than cotton or ramie cloth with less adverse affects from caustics, soaps, bleaches and the like. This material does not shrink and due to its woven nature and the way that it is knitted, the material will not unravel on the edges and ends. Thus, when shroud pins are used to pin it onto a carcass, the pins do not cause the material to tear and form holes as occurs in cotton and ramie shrouds. This material will not allow shrinkage inasmuch as moisture will not escape from beef carcasses, lamb carcasses, veal carcasses or the like. Moisture will not transmit or go through the material from one side of the cloth or fabric to the other thus resulting in practically no shrinkage and practically no loss in weight as compared with other shrouds in which up to 6% moisture is lost from the carcass. The fibers of this material do not have to be presoaked in salt water or saline solutions and need only be dipped in hot water and applied to the carcass.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A glove for use by an operator in a meat processing plant who uses a knife during various meat cutting procedures in which one hand holds the knife and manipulates it adjacent the other hand which is engaged with the meat adjacent the cutting area, said glove being constructed of a flexible knitted fabric constructed of non-metallic aramid fiber, such as "Kevlar," said glove being substantially impenetrable by the knife thereby protecting the wearer from accidental injury due to cutting.

* * * * *